United States Patent [19]

Orminski

[11] Patent Number: 5,179,925
[45] Date of Patent: Jan. 19, 1993

[54] HOT RESTART COMPENSATION

[75] Inventor: John K. Orminski, Ontario, Canada

[73] Assignee: General Motors of Canada Limited, Oshawa, Canada

[21] Appl. No.: 827,792

[22] Filed: Jan. 30, 1992

[51] Int. Cl.[5] ............................. F02D 41/06
[52] U.S. Cl. ..................... 123/491; 123/1 A
[58] Field of Search .............. 123/491, 1 A, 179.16, 123/179.17

[56] References Cited

U.S. PATENT DOCUMENTS

| | | | |
|---|---|---|---|
| 4,224,913 | 9/1980 | Barnard | 123/179.16 |
| 4,706,630 | 11/1987 | Wineland et al. | 123/491 |
| 4,723,523 | 2/1988 | Kataoka et al. | 123/491 |
| 4,945,880 | 8/1990 | Gonze et al. | 123/478 |
| 4,945,881 | 8/1990 | Gonze et al. | 123/486 |
| 4,945,885 | 8/1990 | Gonze et al. | 123/520 |
| 4,951,633 | 8/1990 | Achleitner et al. | 123/491 |

Primary Examiner—Andrew M. Dolinar
Attorney, Agent, or Firm—Howard N. Conkey

[57] ABSTRACT

Selective compensation for reductions in fueling capacity normally associated with extreme fuel vaporization rates in the fuel delivery means of vehicle engines, by improved estimation of the conditions normally precedent to such extreme fuel vaporization rates.

6 Claims, 5 Drawing Sheets

HOT RESTART COMPENSATION

BACKGROUND OF THE INVENTION

It has been determined that in automotive vehicles with internal combustion engines that have been adapted for use with alcohol fuels such as methanol or ethanol fuels, for instance in combination with gasoline, there are certain operating conditions in which conventional fueling of the engine at startup may be inadequate. Specifically, on hot restarts, when an engine is being restarted while hot from previous operation, fuel mixtures including alcohol at certain alcohol concentrations may be prone to extreme vaporization rates at the outlet of the fuel delivery means, which can interfere with proper engine fueling in a manner that is difficult to predict. Typically, such vaporization substantially decreases the amount of fuel made available to the engine which can lead to noticeable engine and catalytic converter operation instabilities.

Compensation for such hot restart fueling deficiencies is provided in the prior art. Known systems attempt to increase the pressure of the fuel in each of the fuel injectors, so as to suppress fuel vaporization at the outlet thereof. Additionally, known systems may attempt to supplement the amount of fuel supplied to the cylinders of the engine, such as by releasing stored fuel vapors into the engine intake air when vaporization is assumed to be taking place, Finally, prior art systems may simply decrease the desired air/fuel ratio to overcome the deficiencies.

Such systems, to be effective, must only compensate the fuel delivery system when needed, as they can have a deleterious effect on engine operation stability if they compensate when the fuel is not vaporizing rapidly. For instance, the engine air/fuel ratio can be driven to a rich condition in an unpredictable and undesirable manner by releasing fuel vapors to the engine, by increasing the pressure of the fuel supplied to the engine, or by increasing the desired air/fuel ratio when such compensation is not needed. Accordingly, a critical element in any approach to hot restart compensation is the capacity to predict accurately when such substantial vaporization will occur.

For a typical fuel delivery system, two conditions should normally be met before the fuel will vaporize at an extreme rate. First, the fuel, composed of conventional gasoline and a portion of either methanol or ethanol, must have an appropriate concentration of methanol or ethanol. There is a known concentration range wherein the fuel will be very volatile, meaning it will vaporize rapidly. Second, the temperature of the fuel delivery means, such as a conventional fuel injector, must be such that the volatile fuel passing through the injector will increase in temperature sufficiently to drive the vaporization rate to an extreme level.

If the injector is above a known threshold temperature, related to the pressure of the fuel in the injector and to the fuel concentration, extreme vaporization rates will normally take place due to extreme fuel volatility. For other concentrations and temperatures however, much less vaporization will likely occur, and additional compensation is not needed. Accordingly, the known prior art systems only compensate the fuel delivery means when the fuel is of a concentration and temperature that will rapidly vaporize at the pressure of the fuel delivery system.

Sensors are available to monitor the concentration of methanol or ethanol in vehicle fuel. However, in conventional systems using fuel injectors, it is difficult and expensive, due to severe packaging constraints, to provide accurate temperature sensors on the fuel injectors themselves. Systems are available in the prior art that check engine coolant temperature as a means of generally verifying that the engine is at a temperature at which vaporization is likely. For a more precise indication of injector temperature, these systems may monitor a fuel temperature sensor disposed in a fuel delivery conduit a distance upstream of the injector.

The difficulty with this fuel temperature sensor arrangement is the lack of a one-to-one mapping between a single sensor temperature and the actual injector temperature. In other words, a single fuel temperature sensor measurement in this arrangement may be indicative of more than one injector temperature. For example, a single sensor temperature may map to an injector temperature at which an extreme vaporization rate is normally possible, and to one at which such a rate is not normally possible. A system using such a mapping will, under certain conditions, provide compensation at times when it is not needed or, alternatively, fail to compensate when needed. Such improper targeting of compensation may exacerbate rather than reduce engine and converter instabilities, or may fail to address the instabilities altogether.

Accordingly, the prior art systems necessarily required the fuel temperature to exceed a very high threshold temperature before providing compensation, to reduce the risk of applying unnecessary compensation, as described. The coverage of such systems was thereby reduced in that the occasionally failed to predict extreme fuel vaporization rate conditions associated with lower sensed fuel temperature. Accordingly, the effectiveness of such prior art systems is limited.

What is needed is an economical method and apparatus for more accurately predicting when compensation is needed, by estimating when the injector temperature is such that, at the pressure and alcohol concentration of the fuel, the fuel will vaporize at an extremely high rate at the fuel delivery means.

SUMMARY OF THE INVENTION

The present invention is a method and apparatus for accurately predicting extreme vaporization rates in vehicle engines fueled by a combination of conventional gasoline and alcohol. The invention requires no additional sensors over conventional engine control systems, such as the above described prior art systems, yet it reduces the inaccuracies noted in the prior art systems. Specifically, the present invention addresses the "weak link" in the prior art estimation of the temperature of the fuel delivery means, such as common fuel injectors. As in the prior art, the present invention may use a conventional fuel temperature sensor disposed in the vehicle fuel upstream of the fuel delivery means at a point where the fuel is heated by radiant engine heat while the engine is shutdown, thereby forming a basis for injector temperature prediction. Further, the present invention may use temperature information from any sensor which is heated by radiant engine heat in a manner related to the way the fuel injectors are heated from that heat.

However, the present invention provides a more accurate mode of the critical fuel delivery means temperature, using change in temperature as an important factor, as well as using a temperature sensor reading in a new way. Accordingly, using this method and apparatus, compensation may be accurately targeted to only those engine startup scenarios that truly need it, so as to reduce hot restart fueling inadequacies without incurring additional instabilities.

DESCRIPTION OF THE DRAWINGS

The invention may be best understood by reference to the following description of a preferred embodiment and to the drawings in which.

DESCRIPTION OF A PREFERRED EMBODIMENT

Figure 1:
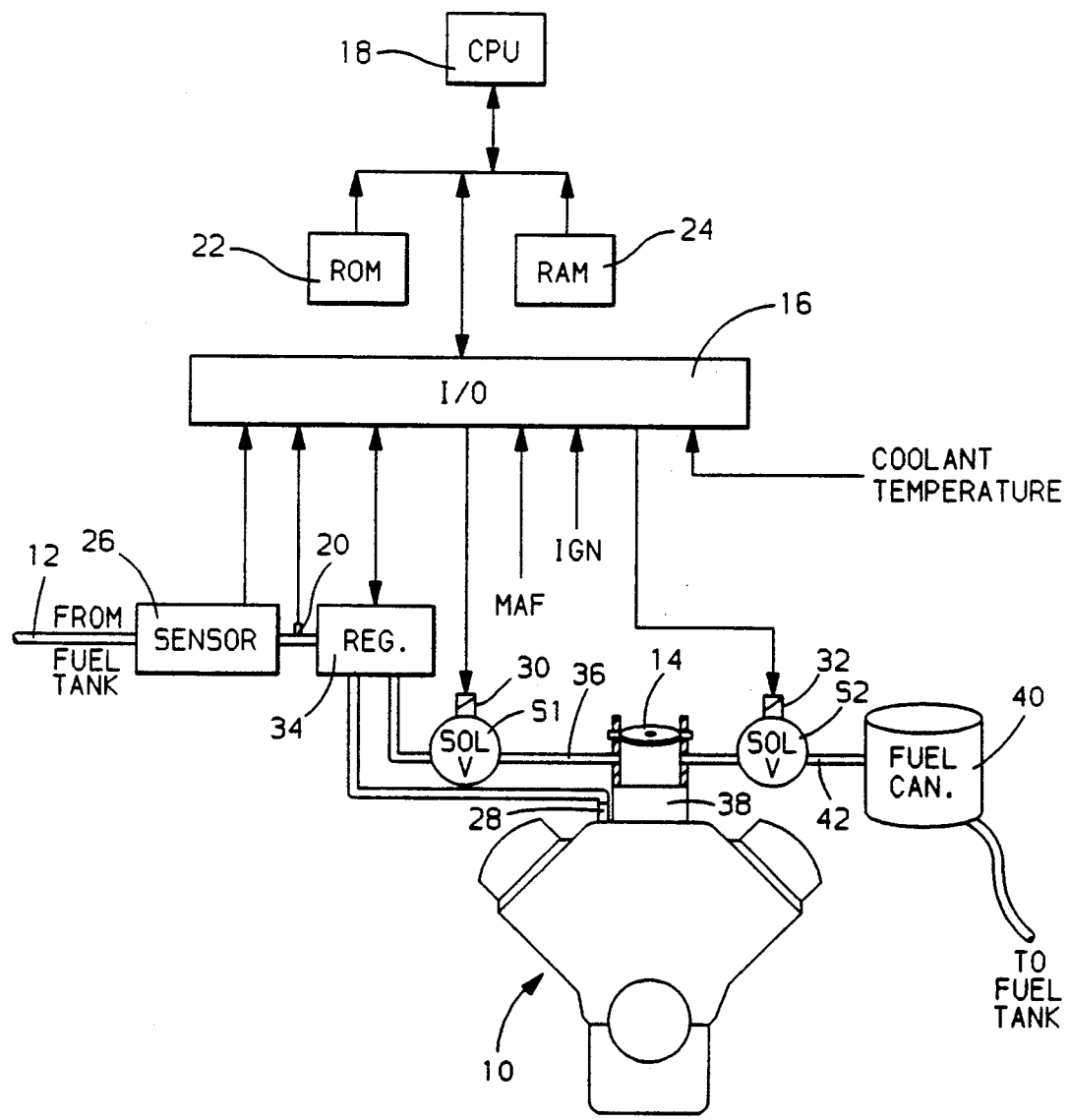
FIG. 1 is a general diagram of an engine adapted for use with gasoline-alcohol fuel sin accord with this invention.

An overview of the system in which this invention is embodied in accord with this embodiment is illustrated in FIG. 1. Specifically, an internal combustion engine 10 is provided with an intake manifold 38 in which the normal engine vacuum creates a negative pressure, preserved in part by the position of a conventional throttle valve 14 disposed between the intake manifold 38 and the atmosphere. The engine 10 has a conventional means of fuel delivery to the cylinders thereof, such as by conventional fuel injectors, one of which is illustrated as element 28 in FIG. 1.

In general, fuel is supplied to the fuel delivery means, via a conduit 12, which passes through a fuel composition sensor 26. The fuel composition sensor 26 generates a signal indicative of the relative proportion of alcohol to gasoline in the fuel flowing therethrough. Several such sensors are known, although the preferred sensor is a capacitive dielectric sensor which measures the dielectric constant of the fuel. Such a sensor is universal in the sense that it provides a correct output for any mixture of any type of alcohol, such as ethanol, methanol, etc., as well as for several motor fuel additives. A sensor that may be used is a capacitive, dielectric constant, fuel composition sensor described in U.S. Ser. No. 268,431, filed on Nov. 7, 1988, by Eugene V. Gonze and assigned to the assignee of this application.

The sensor 26 communicates the sensed composition to an electronic controller which controls engine operation, and may include a central processing unit CPU 18, a read only memory ROM 22, a random access memory RAM 24, and an input/output unit I/O 16.

Also disposed in the fuel conduit 12 is a fuel temperature sensor 20, such as a thermistor, for measuring the temperature of the fuel that passes in proximity to it. The sensor 20 is located in the conduit 12 in proximity to the engine 10, so that the sensor may be heated by radiant engine heat while the engine is disabled. The sensed fuel temperature is communicated to the CPU 18 via the I/O 16. Further in another embodiment, air temperature may be measured by a conventional air temperature sensor (not shown) at a predetermined location in proximity to the engine 10, so that the sensor may be heated by radiant engine heat while the engine 10 is disabled.

Further, the fuel conduit passes through at least one conventional fuel pressure regulating means 34 which, in a manner well known in the art of fuel delivery systems, regulated the pressure across the fuel delivery means, such as fuel injectors 28, to allow a controlled quantity of fuel to be metered to the engine 10 when the fuel injectors are opened. A vacuum line 36 is connected between the fuel pressure regulator 34 and the engine intake manifold 38, so as to provide a varying baseline pressure to the regulator 34. The regulator, in a well-known manner, will attempt to maintain the pressure across the fuel delivery means at a target level that is a preset amount above that varying baseline pressure.

Disposed in the vacuum line 36 is a conventional valve, such as a solenoid valve S1 30 which, when energized by the CPU 18, will interrupt the pressure communicated to the regulator 34 simply by closing off the conduit, so that effectively a baseline pressure of zero will be communicated to the regulator 34. This will cause an increase in the target pressure of the regulator 34, as the baseline pressure increased from the negative manifold pressure to zero pressure. By forcing an increase in the fuel pressure in this manner, fuel vaporization in the injector will, to an extent, be suppressed, according to the well-known relationship between fluid pressure and fluid vaporization rate.

The solenoid is connected to, and controlled by the CPU 18, such that the regulated pressure of the fuel supplied to the engine may be increased only when appropriate. A conventional fuel vapor canister 40 is provided communicating with the vehicle fuel tank (not shown) to store vaporized fuel therefrom in a well-known manner. The canister 40 is purged during engine operation by a valve apparatus such as a conventional solenoid S2 32, which throttles a conduit 42 between the canister 40 and the engine intake manifold 38 to control the induction of fuel vapors to the manifold.

The primary concern in the induction of such vapors into the engine 10 is that, since the air/fuel ratio of the contents of the canister and vapors coming from the fuel tank are not controlled, the induction rate should be limited to prevent the predetermined air/fuel ratio from being significantly changed, or if a closed-loop control is included, to prevent this control from being overwhelmed. In engines using a combination of conventional gasoline and alcohol, such as methanol or ethanol, the duty cycle of operation of the valve S2 32 varies with the amount of airflow into the engine 10, and with the concentration of alcohol in the fuel, so that more vapors may be drawn in to the engine when the engine is ingesting more air in a controlled air/fuel ratio, and so that a more desirable air/fuel ratio may be achieved.

It is well known in the art that, while gasoline engines are normally designed to operate at a stoichiometric air/fuel ratio of 14.7 for optimum combustion of gasoline consistent with a three way catalytic converter (not shown), the stoichiometric air/fuel ratio of methanol is 6.4, and is 9.0 for ethanol. Therefore, it is consistent that more vapors would be admitted into the engine 10, when higher concentrations of these alcohol constituents are detected in the fuel.

An appropriate program is stored in ROM 22 to coordinate receipt of input information from various sensors, perform calculations and table lookups and output commands to various actuators of engine related components. The CPU is receives the inputs and transmits the outputs via the input/output means I/O 16. Included in the inputs to the CPU 18 via the I/O 16 are engine coolant temperature from a conventional temperature sensor (not shown), and an ignition enabled signal IGN, indicating the vehicle ignition switch has been placed in its "on" or "off" positions. Further, the CPU 18 is provided the information with which to determine the mass airflow into the engine, for instance using well-known speed density estimation techniques, or by simply using a conventional mass airflow sensor (not shown), which communicates a mass airflow value MAF to the CPU 18, via the I/O 16.

Figure 2:
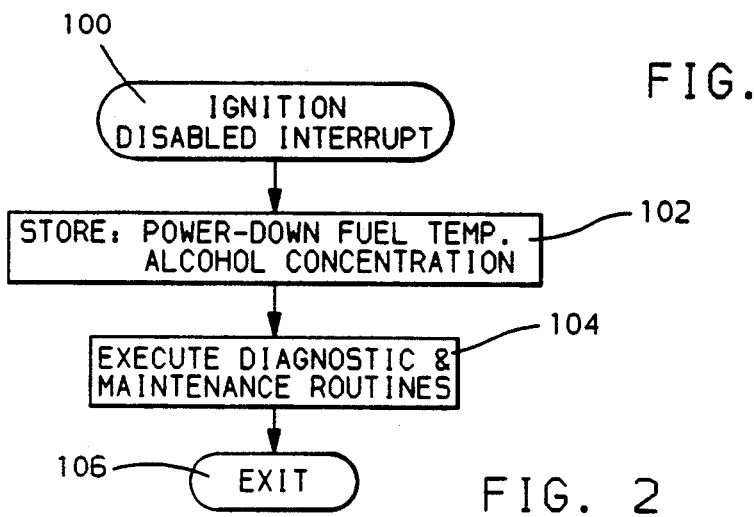
FIGS. 2 through 5 are computer flow diagrams illustrating the steps involved in carrying out this invention in accord with a preferred embodiment.

The routines in which the invention in accord with this embodiment are carried out, are illustrated in FIGS. 2 through 5. Specifically, the routine of FIG. 2 is entered when the CPU 18 senses that conventional vehicle ignition power has been interrupted, such as when the vehicle operator has turned the ignition switch to its "off" position. This ignition disabled interrupt routine is entered at step 100, and proceeds to step 102 to store the "power-down" fuel temperature as sensed by the fuel temperature sensor 20. In another embodiment, a temperature value related to fuel temperature may be stored at this step, such as air temperature from the above-described air temperature sensor. This temperature, whether of fuel, air, or some related parameter, is used later in accord with this invention in an estimation of fuel injector temperature. Also at step 102, the concentration of alcohol in the fuel, as read from the sensor 26 is stored, for use later in this embodiment.

The routine next moves to step 104, to execute any conventional diagnostic and maintenance routines that may be needed when ignition power is interrupted. The routine of FIG. 2 is next exited at step 106, at which time the controller may execute any common routines that may be needed while ignition is off, or the processor may simply so into a well-known wait state.

Figure 3A:
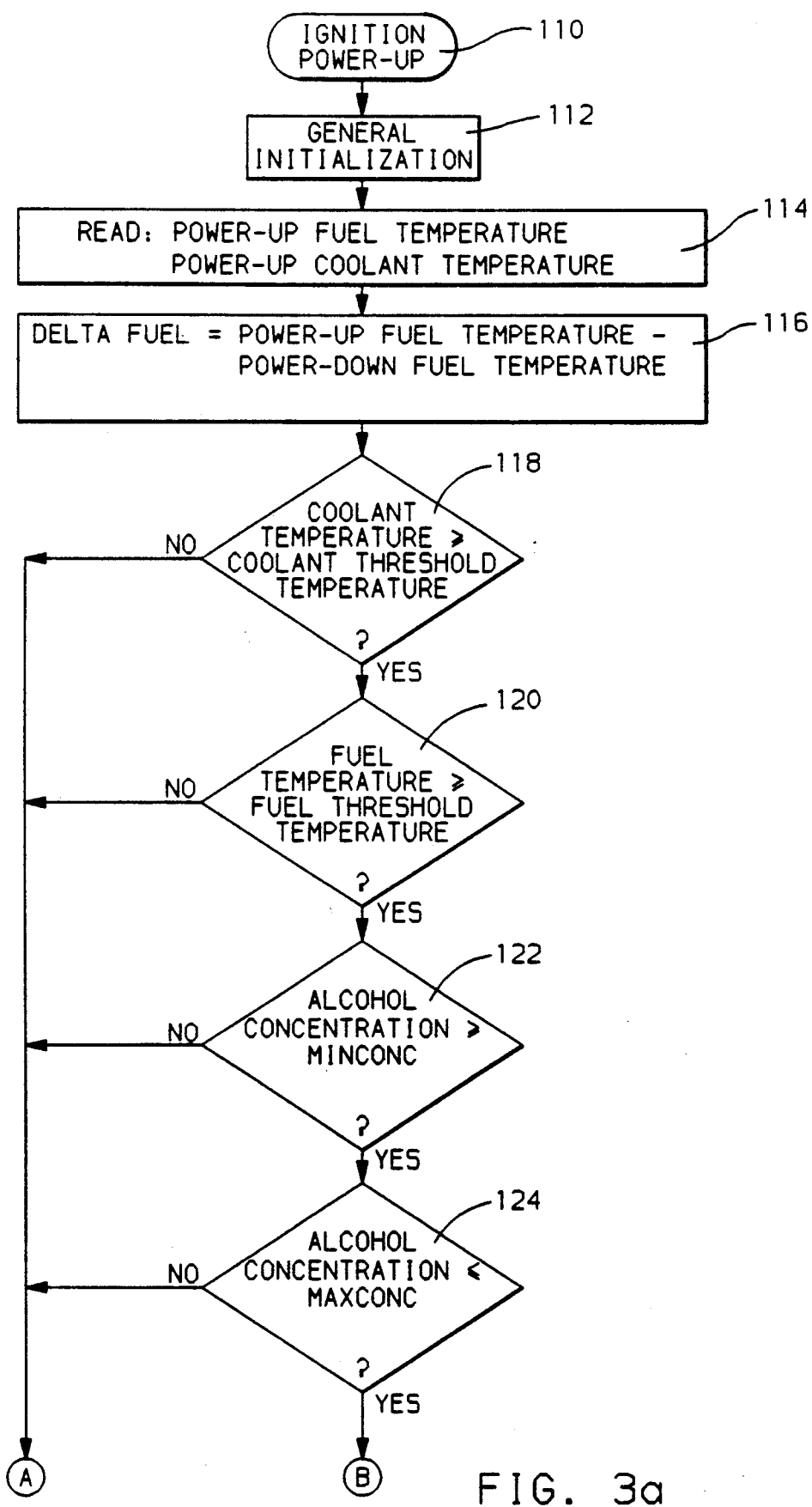
Figure 3B:
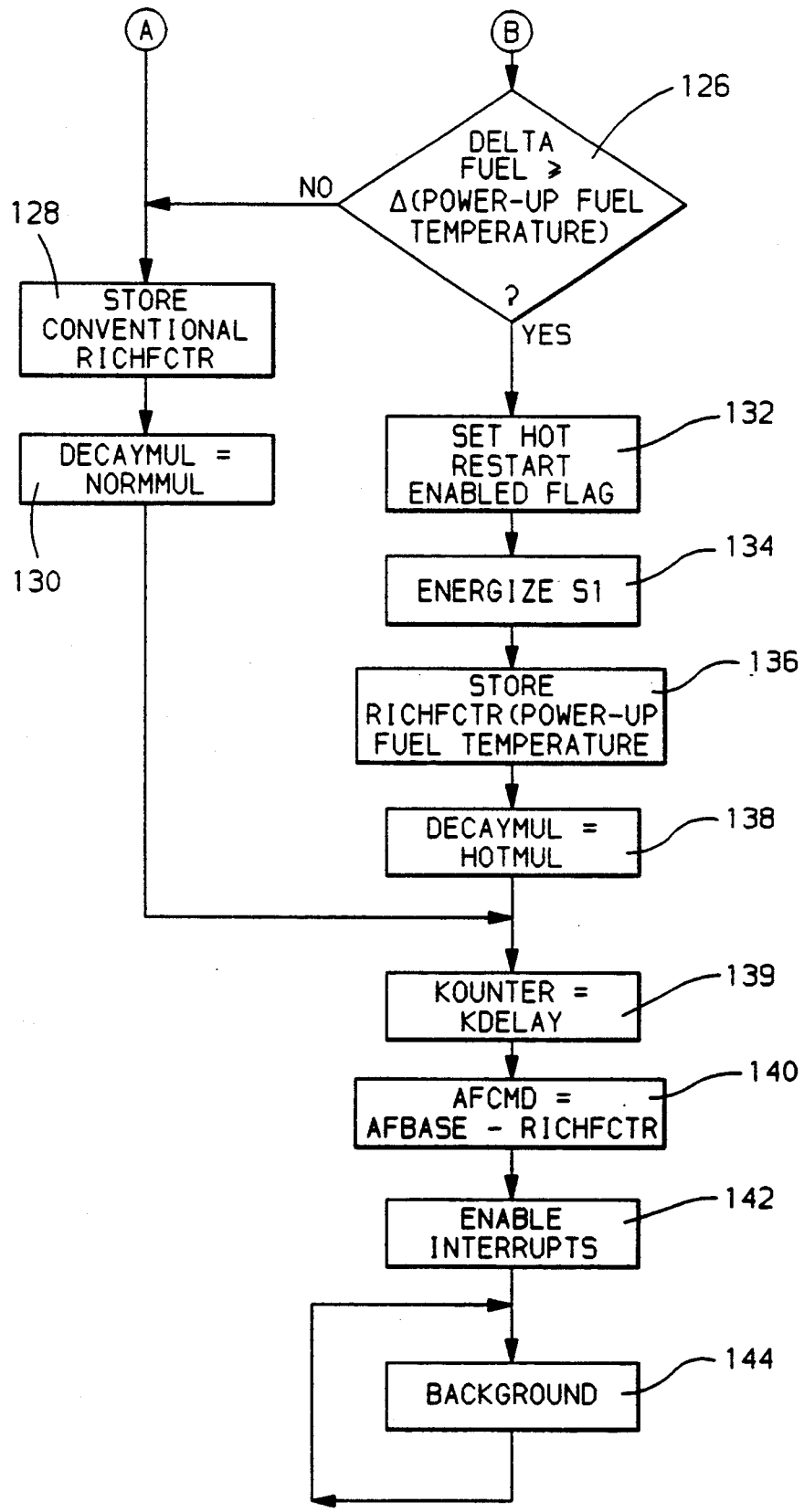

Upon re-application of ignition power to the system, the processor moves to the routine of FIG. 3, for general initialization, as is well-known in the art, and, in this embodiment, for a determination whether the hot restart algorithm in accord with this invention is needed. Specifically, the routine of FIG. 3 is entered at step 110, and moves to step 112, for general system initialization. For example, at this step, data constants may be transferred from read only memory ROM 22 locations to random access memory RAM 24 locations, and pointers, counters, and flags may be initialized.

Next, the routine proceeds to step 114, to read and store values needed in accord with this embodiment. First, the routine determines power-up fuel temperature from the fuel temperature sensor 20, and stores the value in RAM 24. As described, the temperature of other parameters may be substituted in this step, providing the parameter is heated by radiant engine heat while the engine is disabled in a way related to the heating of the fuel injectors 28. Next, the power-up coolant temperature is read from a conventional coolant temperature sensor (not shown) and stored in RAM 24.

After reading and storing the values at step 114, the routine moves to step 116, to determine a delta fuel value as the difference between power-up fuel temperature as determined at step 114, and power-down fuel temperature as determined at step 102 of the routine of FIG. 2. The difference called delta fuel, will be used later in this embodiment in a prediction of the hot restart condition. Equivalently, the temperature difference of other parameters, such as engine coolant or air in proximity to the engine may be calculated here.

The routine next advances to steps 118 through 126 to determine whether the conditions normally precedent to extreme vaporization rates exist in the system, which would warrant hot restart compensation. These conditions generally include fuel composition and fuel temperature. First, at step 118, the temperature of the engine coolant is checked. Although not directly indicative of fuel temperature, the coolant temperature check is a simple way to determine the general status of the temperature of the engine, as an indirect indication of the fuel injector temperature. If the coolant is below a relatively low calibrated threshold value, which is 75 degrees Celsius in this embodiment, hot restart compensation is assumed to be unnecessary, as the engine generally is so low in temperature that there is very little risk of the discussed extreme vaporization rates.

Accordingly, if the power-up coolant temperature is below the calibrated coolant threshold temperature value at step 118, hot restart compensation is bypassed, and the routine of FIG. 3 proceeds to carry out conventional dual fuel vehicle engine enrichment functions illustrated at steps 128 and 130.

Specifically, at step 128, a factor used to enrich the desired air/fuel ratio, called RICHFCTR, is assigned a value in accord with conventional engine control initialization. As is well-known in the art of engine control, the value is calibrated for the specific engine as the amount of decrease in the engine air/fuel ratio needed for acceptable operation at and soon after engine startup.

Typically, the value assigned to RICHFCTR varies with engine coolant temperature and with alcohol concentration in the fuel, both of which directly affect the capacity to delivery fuel to the engine, as is well-established in dual fuel engine control. As is also well-known in the art, RICHFCTR, or some fraction thereof, will be subtracted from the desired air/fuel ratio for a period of time after startup, and the control system will attempt to drive the actual air/fuel ratio to that desired value, via conventional open-loop or closed-loop engine air/fuel ratio control strategies.

After assigning a value to RICHFCTR at step 128, the routine proceeds to step 130, where a multiplication factor called DECAYMUL is assigned a calibration value NORMMUL, which is a fractional value, less than one, by which RICHFCTR will be attenuated each time a conventional event based engine control routine is executed. Like RICHFCTR, the value assigned to DECAYMUL can vary with coolant temperature and alcohol concentration, for the reasons discussed. After carrying out the normal startup enrichment functions, the routine of FIG. 3 proceeds to step 139, to be discussed.

Returning to step 118, if the coolant temperature is equal to or above the threshold value, a first hot restart condition has been met, and the routine proceeds to step 120, to check a second temperature condition, the power-up fuel temperature or other related temperature values, as discussed. Beyond providing basic temperature information, the power-up temperature provides a rough estimation of injector temperature. For instance, an estimate of a hot injector may not be of concern if the fuel temperature is so low that it could not be heated by the injector to a temperature associated with an unacceptable vaporization rate. Further, the injector may be estimated to be so low in temperature that even hot fuel is not a concern.

Accordingly, a threshold temperature value may be determined in a calibration step based on the desired relationship between the temperature for example of fuel and injector temperature using these guidelines. In this embodiment, using fuel temperature, the threshold temperature was set at 35 degrees Celsius, well below the discussed prior art temperature threshold value. The decrease in the threshold value allows increased coverage of the high fuel vaporization rate conditions, and is possible because fuel temperature is used for a new purpose in the present invention. The discussed prior art systems used the power-up fuel temperature as a direct indication of injector temperature. However, the present invention provides a more accurate model of injector temperature, as will be described at step 126. Accordingly, the power-up fuel temperature may be relegated to a mere threshold determination, as discussed at step 120.

Returning to FIG. 3, if the power-up temperature is below the calibrated threshold temperature value at step 120, the routine proceeds to bypass the hot restart algorithm, and executes steps 128 and 130, as discussed. Alternatively, if the temperature is equal to or above the threshold temperature value, the hot restart algorithm may be needed, and the routine proceeds to steps 122 and 124, to determine whether the concentration of alcohol in the vehicle fuel is within a predetermined volatile range.

Figure 6:
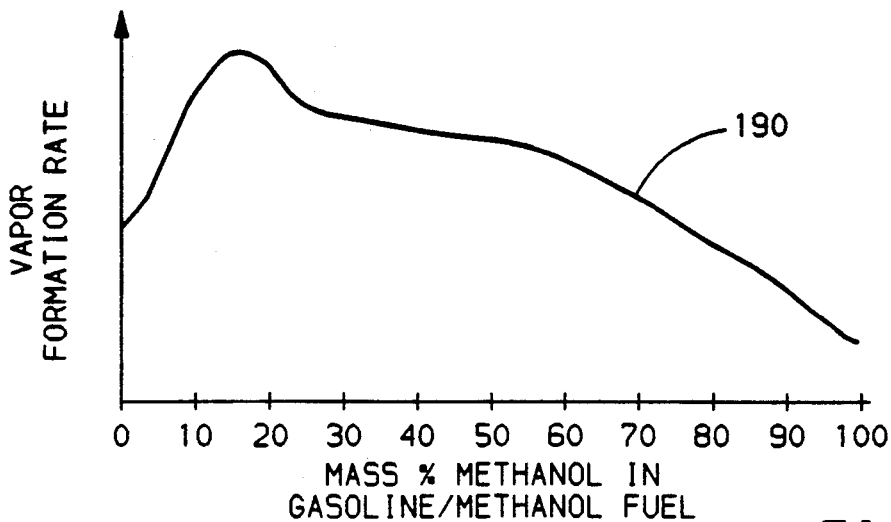
FIG. 6 is a diagram illustrating the relationship between alcohol concentration in gasoline-alcohol fuels and fuel volatility.

FIG. 6 shows the general volatility or vaporization rate of a gasoline-methanol fuel mixture, as a function of the concentration of methanol therein at a given temperature. Increased temperature generally increases the volatility shown in the curve 190, but does not significantly change the dependence of volatility on methanol concentration. The volatility is seen as lowest at the ends of the curve 190, where the fuel is either pure gasoline or pure methanol. However, in the central portion of the curve, the fuel, especially under hot restart injector temperatures, will vaporize at the injector tip so quickly that a substantial quantity of fuel vapor, rather than fuel liquid, will be metered by the injector into the engine, substantially reducing the density of the fuel charge, and the air/fuel mixture will be significantly enleaned. In this embodiment, the volatile alcohol concentration range was selected as extending from approximately 3.5 percent alcohol in the fuel to approximately 64.5 percent alcohol.

To determine if the actual concentration is within this volatile range, the routine at step 122, compares the concentration of alcohol in the fuel, as read at step 103 of the routine of FIG. 2, to a predetermined value called MINCONC, which is indicative of the minimum concentration within the volatile range. If above MINCONC, the routine proceeds to step 124, to determine if the concentration is less than or equal to MAXCONC, the upper bound volatile range value. If not, extreme vaporization rates are assumed to be unlikely, and the routine of FIG. 3 avoids the hot restart algorithm by proceeding to steps 128 and 130, as discussed.

Alternatively, if the concentration is within the volatile range, the routine proceeds to step 126, where the delta temperature value, as calculated at step 116 of the routine of FIG. 3, is compared to a value delta, which is a temperature difference threshold above which, the fuel injectors 28 in accord with this embodiment are predicted to be at a temperature that will so increase the fuel vaporization rate that compensation will be needed.

The threshold is referenced from controller memory such as ROM 22, as a predetermined function of power-up temperature of, for example fuel. The relationship between the threshold value and power-up fuel temperature is application specific, and may be determined in a calibration step, using the following considerations.

As noted, the fuel temperature sensor 20, or other related sensor such as manifold air temperature sensor, is located in proximity to the engine 10, such that it is subject to heating from radiant engine heat while the engine is disabled. The injectors 28 are also subject to such heating, but in a much more direct way, as they are typically disposed directly on the engine 10. The relationship between temperature at the sensor and injector temperature is a direct result of their relative location. It is important to note that any sensor in proximity to the engine that is heated from radiant engine heat while the engine is disabled may be used a a substitute for the fuel temperature sensor, to model the heating of the injectors in accord with this invention.

For instance, at high power-up fuel temperatures, very little increase in fuel temperature from power-off to power-on ignition will indicate an injector 28 of notably high temperature. Alternatively, at low power-up fuel temperature, a substantial increase in fuel temperature is necessary to indicate a notably high injector temperature. Such a dramatic increase in the fuel temperature, which is in proximity to the engine 10, but is not subject to the same heating environment as the injectors 28, which are typically disposed directly on the engine 10, indicates that there is a substantial amount of heat being released by the engine which will increase the injector temperature by an amount that, when operating on volatile fuels, will cause notably high vaporization rates.

In practice, such conditions may exist when the engine 10 is operating for a period of time in cold weather, where the flow of cool air around the vehicle may keep the fuel cool, but, upon stopping the engine 10, substantial heating of the injectors 28 may still occur. By monitoring the actual temperature of the fuel injectors, for example by placing a conventional temperature probe on the injector outlet, under these varying power-up fuel temperatures for a given engine, a model of the relationship between power-up fuel temperature and the increase in temperature required to indicate a notably hot injector may be developed and stored in ROM 22, for the purposes of the comparison at step 126.

Returning to FIG. 3, if delta temperature is less than the delta threshold value, the injector temperature is predicted to be low enough that any vaporization of the fuel can be compensated by conventional air/fuel ratio control, and the hot restart routine is avoided, by proceeding to steps 128 and 130, as discussed. However, if delta fuel is greater than or equal to the delta threshold value, all of the conditions precedent to hot restart compensation have been met, and the routine proceeds to steps 132 through 138, to begin to apply hot restart compensation.

Specifically, the routine first moves to step 132, to set a hot restart flag in processor memory, such as RAM 24, to indicate that hot restart compensation is now active. Next, the routine proceeds to step 134, to energize a solenoid S1 30. This solenoid is a means by which the pressure across the conventional fuel injectors 28 may be increased. Conventional fuel injection systems have a fuel pressure regulator 34 used to maintain the fuel line pressure at some desired pressure, consistent with metering a controlled amount of fuel to the engine. The target or desired pressure set by the regulator is a preset amount above a baseline pressure, the baseline pressure often being the engine intake manifold pressure, which can be communicated to the regulator via a vacuum hose 36 connected between the engine intake manifold 38 and the regulator 34.

When, for instance in hot restart compensation, it is desired to increase the pressure across the injectors 28, for the well-known purpose of reducing the high vaporization rate of the fuel, the solenoid 30 is energized in the regulator vacuum line 36, to increase the baseline pressure of the regulator from manifold pressure to zero pressure. The regulator 34 will then control to a higher target pressure across the injectors 28. Accordingly, the high vaporization rate associated with hot restart conditions will be, to an extent, suppressed, and the air/fuel ratio will be enriched, consistent with the needs of the engine.

Returning to the routine of FIG. 3, after energizing S1 30 at step 134, which will eventually be de-energized when no longer needed, the routine proceeds to step 136, to assign a value to RICHFCTR. As described, RICHFCTR is ultimately subtracted from the desired engine air/fuel ratio value in a manner well known in the art of engine air/fuel ratio control, so as to enrich the air/fuel ratio consistent with the needs of the engine at startup. The specific value assigned to RICHFCTR at step 136 may be referenced from processor read only memory 22 solely as a function of fuel power-up temperature, as the conditions for hot restart have been met.

For instance, knowing the fuel will vaporize very rapidly at the injector tip, resulting in the metering of an amount of fuel vapor rather than just liquid fuel, under the present hot restart conditions, RICHFCTR should be assigned a relatively large value to compensate the air/fuel control accordingly. However, the precise magnitude of that value may be further refined using power-up fuel temperature, as higher temperature fuel will exacerbate the vaporization effect more than lower temperature fuel, and will require additional enrichment as can be provided by a larger RICHFCTR. Such a relationship between the desired value of RICHFCTR and power-up fuel temperature may be determined in a calibration step for the given application, and can be stored as a lookup table in ROM 22.

After determining the appropriate value to assign to RICHFCTR, such as by referencing a table of power-up temperature versus RICHFCTR values, and choosing the RICHFCTR value corresponding to the present power-up temperature and, after storing the value in processor random access memory at step 136, the routine moves to step 138, to determine a decay multiplier, DECAYMUL, corresponding to the determined hot restart condition. As discussed, DECAYMUL is a factor, less than one, by which RICHFCTR will be reduced each time through the routine illustrated in FIG. 5, to be discussed. The value assigned to DECAYMUL when in a hot restart condition is called HOTMUL, the value of which may be determined via conventional calibration under hot restart conditions as the preferred percent decrease in hot restart enrichment each time through the routine of FIG. 5.

After assigning DECAYMUL the value HOTMUL at step 138, or after executing step 130 when not in a hot restart condition, the routine advances to step 139 to set a counter value KOUNTER, to be discussed, to an initilization value called KDELAY. Next, the routine proceeds to step 140, to decrease the desired air/fuel ratio AFBASE by the amount RICHFCTR, established at step 128 or step 136. AFBASE may, in accord with well-known engine control principles, be predetermined, or may be determined at some initialization step, such as step 112 of the routine of FIG. 3. Such a decrease will enrich the target air/fuel ratio as discussed, so as to provide the additional fuel needed under the determined engine start-up conditions. The decreased target air/fuel ratio, called AFCMD, may be stored in processor random access memory 24 for later use.

The routine next moves to step 142, to enable interrupts in a conventional manner, so as to allow interrupt driven routines as used in conventional engine control to be executed at appropriate times while the processor is operating. The routine next proceeds to step 144, which is a continuously repeated background routine. This routine may carry out minor diagnostic and maintenance routines, and will be interrupted upon the occurrence of any of the enabled interrupts.

Figure 4:
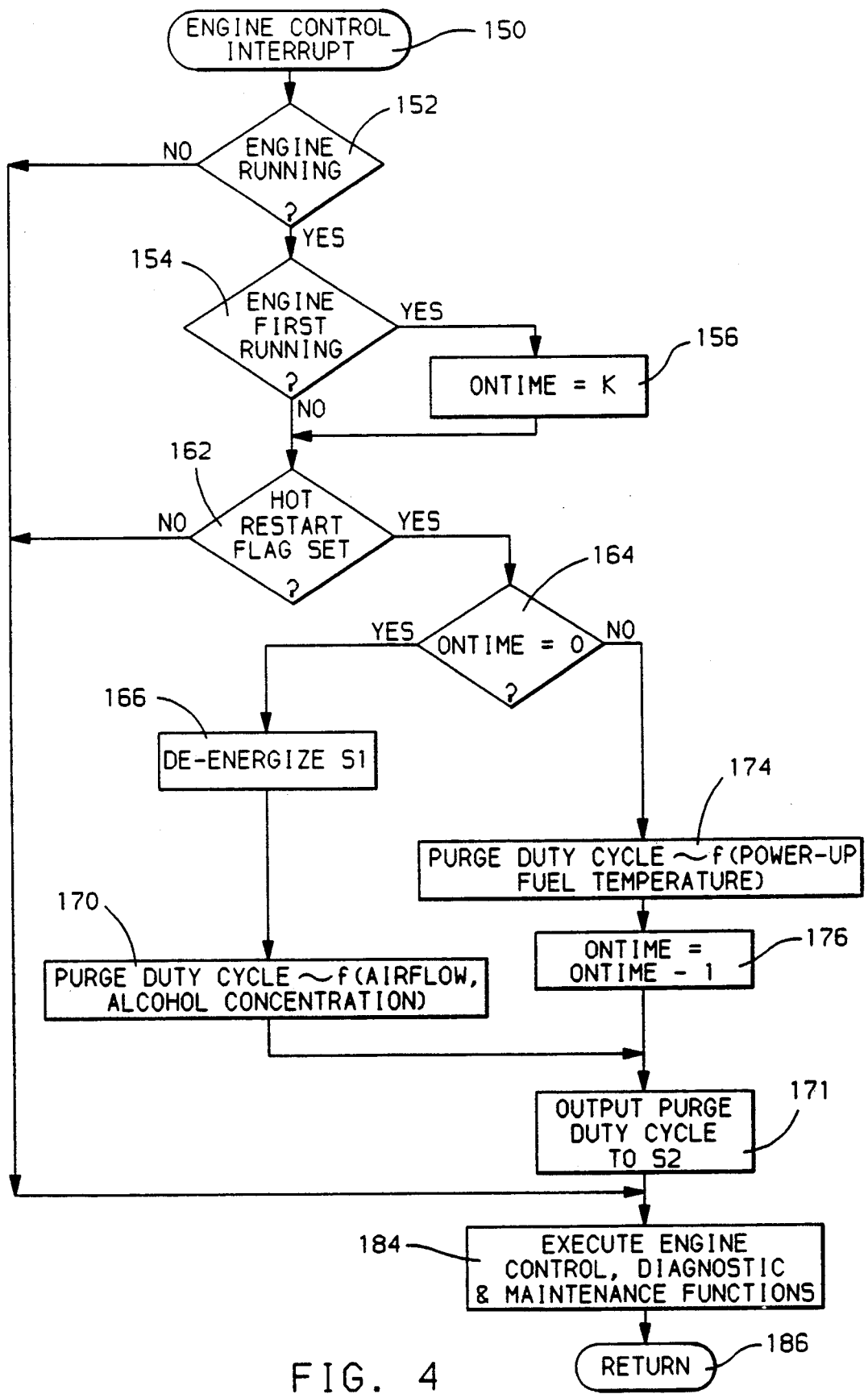

One such interrupt may occur in conventional processors when a loss of ignition power to the processors 18 is detected, at which time the routine of FIG. 2 is executed, as discussed. FIG. 4 illustrates a time-based interrupt in this embodiment, in that this interrupt is executed after a predetermined period of time has elapsed since the enabling of the interrupt or since the last occurrence of the interrupt. This interrupt is an engine control interrupt, generally used to execute conventional engine control functions. Additionally, in this embodiment, hot restart functions are executed in this interrupt. In this embodiment, this engine control interrupt occurs every 12.5 milliseconds.

Specifically, upon the occurrence of the engine control interrupt, the routine illustrated in FIG. 4 is executed, starting at step 150. The routine proceeds to step 152, to determine if the engine is running. The engine may be detected to be running by monitoring a pulse train from a conventional engine speed sensor (not shown) when a conventional engine starter (not shown) is disabled. A sustained train of pulses may be used to indicate a running engine. If the engine is determined not to be running at step 152, the routine proceeds to carry out conventional engine control functions that may be needed prior to engine running at step 184, and then proceeds, via step 186, to return to the background routine of FIG. 3.

However, if the engine is found to be running at step 152, the routine moves to step 154, to determined if the engine is first running, meaning the present iteration of the routine of FIG. 4 is the first iteration of the routine since it was enabled at step 142 of FIG. 3, in which the engine was determined to be running. If the engine is first running, the routine proceeds to step 156 to set a value ONTIME to a predetermined constant K.

ONTIME, to be used later in this embodiment, is the approximate number of engine control routine iterations, as reflective of a predetermined amount of time, during which the hot restart compensation in accord with this embodiment should be active. This number of iterations is calibrated as the amount of time necessary under normal operation, for the fuel injectors 28 to be sufficiently cooled, such as by the flow of lower temperature fuel through them, so that the fuel vaporization rate will decrease to a level compensable by conventional air/fuel ratio control means. Once that calibrated time has passed, as indicated by ONTIME being decremented to zero, hot restart compensation will be disabled.

ONTIME may be determined in a calibration step by monitoring the fuel injector cooling process, under normal conditions. In this embodiment, ONTIME is set to 2960. As ONTIME will be decremented each time the routine of FIG. 4 is executed, such a value of ONTIME represents that hot restart compensation will be active for approximately 37 seconds after the engine is determined to be running.

After initializing ONTIME at step 156, or if this first iteration had occurred previously as determined at step 154, the routine proceeds to step 162, to determine if hot restart compensation is enabled, indicated by the hot restart flag, as would have been set at step 132 of the routine of FIG. 3. If the flag is not set, the routine proceeds to step 184, to carry out conventional functions, as discussed. However, if the flag is set, the routine proceeds to step 164, to determine if ONTIME, which is decremented during hot restart each time the routine of FIG. 4 is executed, has been decremented to zero.

If ONTIME is zero, a sufficient amount of cooling of the fuel injectors 28 is assumed to have occurred, so that further compensation in accord with this invention is deemed unnecessary, and the routine of FIG. 4 proceeds to disable the solenoid S1 30 at step 166. By disabling S1 30, the vacuum line 36, between the pressure regulator 34 and the engine intake manifold 38 is opened, such that a substantial negative pressure (vacuum) is applied as a control input to the regulator, decreasing the regulated fuel pressure across the fuel injector 28, as discussed.

The routine then proceeds to step 170, to determine a purge control valve duty cycle. As vapor from the canister 40 was admitted for hot restart compensation, it is determined to be desirable to continue such compensation after hot restart has timed out, so as to avoid a significant change in engine fueling. Accordingly, vapors are admitted to the intake manifold at a rate related to the duty cycle determined at step 170. This duty cycle varies with airflow into the engine and with alcohol concentration, which is consistent with known vapor metering practice.

Prior art purge control schedules the duty cycle of the valve, which may be a simple solenoid S2 32, as a function of the concentration of alcohol in the fuel, and as a function of the airflow to the engine. The concentration of alcohol is related to the vaporization rate of the fuel, as illustrated in FIG. 6, wherein at certain volatile concentrations of alcohol, the purge control valve duty cycle should be increased to compensate for fuel inadequacies due to the vaporization.

Furthermore, the duty cycle is determined as a compromise between the conflicting goals of removing fuel vapor form the canister 40 as it evaporates from the fuel tank and altering the air/fuel ratio, as related to the engine airflow and alcohol concentration, as little as possible. After determining an appropriate purge duty cycle at step 170, the routine proceeds to step 171, to output the duty cycle in usable form to the solenoid S2 32. The solenoid may require the signal from the controller I/O 16 to be conditioned, such as by a conventional solenoid driver circuit (not shown) which, when receiving a duty cycle command from the I/O 16, energizes and de-energizes the solenoid at that duty cycle, so as to meter a desired amount of canister vapor into the engine intake manifold 38.

Returning to step 164, if ONTIME has not been decremented to zero, hot restart compensation is assumed to still be needed, and the routine advances to steps 174 and 176 to continue to provide hot restart compensation. Specifically, at step 174 a hot restart purge control solenoid duty cycle is determined as a function of the sensed power-up fuel temperature, as was read at step 114 of the routine of FIG. 3. The relationship between the valve duty cycle and the power-up fuel temperature may be determined via conventional calibration.

As the purge solenoid duty cycle, which was determined at step 174, will only be applied while in hot restart, the duty cycle can be related purely to fuel temperature, wherein higher temperature fuel will require more enrichment, such as can be provided by a higher duty cycle. Once the relationship is calibrated for a specific application, it may be stored in ROM 22, for reference at step 174.

After determining the hot restart purge control solenoid duty cycle at step 174, the routine moves to step 176 to decrement ONTIME by one, indicating that another iteration of the compensation has been carried out. Next, the routine moves to step 171, to output the commanded duty cycle, whether computed in a hot restart condition or not, in usable form to the solenoid S2, 32, as discussed.

Next, the routine advances to step 184, to carry out any other functions needed in conventional engine control, before exiting the routine of FIG. 4. For example, such conventional commands as a fuel injector pulsewidth command or a spark command may be generated at this step. Further, any diagnostic and maintenance functions may be carried out at this step. After executing any conventional functions as may be needed in the common engine control interrupt, the routine proceeds to step 186, where it is directed to return to the background routine, illustrated as step 144 of the routine of FIG. 3.

Figure 5:
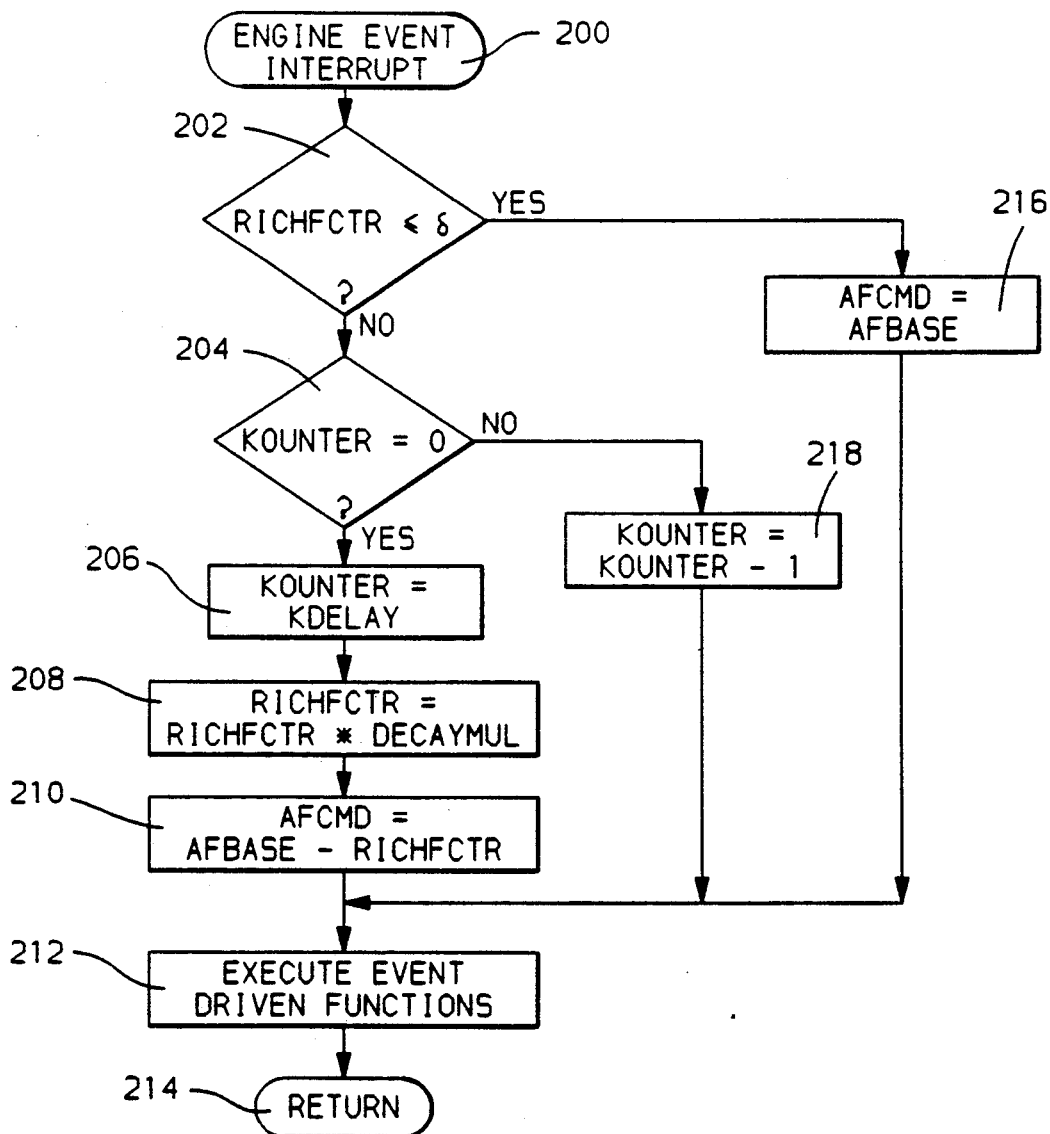

The routine of FIG. 5 is, like the routine of FIG. 2, an event-based interrupt routine. The routine of FIG. 5 is based on an engine event, such as the transmission of a pulse from an engine speed sensor, the frequency of such pulses being related to the engine speed. Routines driven by such events are generally known in the engine control art. Upon the receipt of such an event, the routine illustrated in FIG. 5 is executed to appropriately service the interrupt, in accord with this embodiment. Beyond any conventional interrupt service functions carried out in FIG. 5, hot restart functions may also be executed.

Specifically, FIG. 5 is entered upon the detection of the event, at step 200, and proceeds to step 202, to determine whether RICHFCTR has been reduced substantially to zero. As discussed, RICHFCTR is a dynamic value used to reduce the desired air/fuel ratio that the conventional air/fuel ratio control will attempt to maintain while the vehicle is operating. The reduced air/fuel ratio provides an enriched air/fuel mixture to the engine, which tends to improve engine operating stability under startup conditions, such as hot restart conditions.

As the engine continues to operate, it is generally known that the engine control becomes less dependent on such compensation, and RICHFCTR may be reduced. Accordingly, in this embodiment, RICHFCTR is reduced in the routine of FIG. 5 at a rate related to the engine speed, as indicated by the engine event which initiates FIG. 5. Such reduction will continue until RICHFCTR has an insignificant effect on the commanded air/fuel ratio, such as when it is less than the predetermined value δ.

Accordingly, at step 202, if RICHFCTR is less than or equal to δ, the routine advances to step 216, to set AFCMD to AFBASE, which may, for example, be the stoichiometric air/fuel ratio. The routine then moves to step 212, to execute any functions that may need to be carried out at the above-described engine event, consistent with well-known engine control techniques. The routine then proceeds to step 214, where it is directed to return to the background routine of FIG. 3.

Returning to step 202, if RICHFCTR is greater than δ, additional compensation of the desired air/fuel ratio is assumed to be needed, and the routine proceeds to step 204, to determine whether KOUNTER, which was initialized at step 139 of the routine of FIG. 3, has been decremented to zero. KOUNTER is used to delay the decrease of RICHFCTR consistent with the needs of the engine. For instance, it may be determined in a calibration step that after a number KDELAY of engine events under hot restart conditions, RICHFCTR should be decreased by the multiplicative factor DECAYMUL. Accordingly, the value KOUNTER should be set to KDELAY, such that after KDELAY events, which is the same as KDELAY iterations of the routine of FIG. 5, RICHFCTR will be decreased. KOUNTER is decremented each time the routine of FIG. 5 is executed, until RICHFCTR is reduced substantially to zero.

Returning to step 204, if KOUNTER is not reduced to zero, the routine moves to step 218, where KOUNTER is decremented. Next, the routine proceeds to step 212 to carry out conventional event-driven functions, as discussed. However, if, at step 204, KOUNTER is reduced to zero, then RICHFCTR must be reduced, as discussed. Accordingly, the routine proceeds to step 206, to reset KOUNTER to its initial value KDELAY, to time the next reduction of RICHFCTR, if necessary. The routine then advances to step 208, to reduce RICHFCTR by the multiplicative factor called DECAYMUL, as discussed.

Next, the routine proceeds to step 210, to subtract RICHFCTR from the base air/fuel ratio, such as for example the stoichiometric air/fuel ratio, to arrive at the desired air/fuel ratio AFCMD, for use in the conventional air/fuel ratio control in accord with this embodiment. The routine then proceeds to step 212, to carry out conventional event driven functions, as discussed, after which it returns, via step 214, to the background routine of FIG. 3, as discussed.

The foregoing description of a preferred embodiment for the purpose of explaining the principles of this invention is not to be considered as limiting or restricting the invention since many modifications may be made by the exercise of skill in the art without departing from the scope of the invention.

The embodiments of the invention in which an exclusive property or privilege is claimed are defined as follows:

1. A method of controlling hot restart fuel delivery to an internal combustion engine having fuel injectors for injecting metered quantities o fuel to the engine, the method comprising the steps of:
   locating a temperature sensor at a predetermined location at which the sensor is heated by the engine;
   storing in a memory a schedule of hot restart temperature threshold values as a predetermined function of restart values of the temperature sensor at the predetermined location;
   sensing a shutdown temperature of the temperature sensor at engine shutdown and at the predetermined location;
   sensing a restart temperature of the temperature sensor at initiation of engine starting and at the predetermined location;
   retrieving the hot restart temperature threshold value from the memory corresponding to the sensed restart temperature;
   determining a hot restart fuel adjustment amount when the sensed restart temperature is greater than the sensed shutdown temperature by an amount greater that the retrieved hot restart temperature threshold value;
   determining a fuel command value equal to a predetermined base restart fuel amount adjusted by the determined hot restart adjustment fuel amount; and
   controlling the fuel injectors to deliver fuel to the engine in accord with the determined fuel command value.

2. The method of claim 1, wherein the step of determining a hot restart fuel adjustment amount determines the hot restart fuel adjustment amount as a predetermined function of the sensed restart temperature.

3. An apparatus for controlling hot restart fuel delivery to an internal combustion engine fueled by a combination of gasoline and alcohol, the engine having fuel injectors for injecting metered quantities of fuel to the engine, comprising:
   fuel temperature sensing means disposed at a predetermined location at which the fuel is heated by the engine;
   memory means in which is stored a schedule of hot restart temperature threshold values as a predetermined function of fuel temperature at the predetermined location;
   means for sensing a shutdown fuel temperature at engine shutdown and at the predetermined location;
   means for sensing a restart fuel temperature at initiation of engine starting and at the predetermined location;
   retrieving means for retrieving a hot restart temperature threshold value from the memory means corresponding to the sensed restart fuel temperature;
   means for determining the concentration of alcohol in the fuel;
   means for comparing the determined alcohol concentration to a predetermined volatile concentration range;
   means for determining a hot restart fuel adjustment amount when the sensed restart fuel temperature is greater than the sensed shutdown fuel temperature by an amount greater than the retrieved hot restart temperature threshold value, and when the determined alcohol concentration is within the predetermined volatile concentration range;
   means for determining a fuel command value equal to a predetermined base restart fuel amount adjusted by the determined hot restart adjustment fuel amount; and
   controlling means for controlling the fuel injectors to deliver fuel to the engine in accord with the determined fuel command value.

4. The apparatus of claim 3, wherein the hot restart fuel adjustment amount is a predetermined function of the sensed restart fuel temperature.

5. A method of controlling hot restart fuel delivery to an internal combustion engine having fuel injectors for injecting metered quantities of fuel to the engine, the method comprising the steps of:

locating a fuel temperature sensor at a predetermined location at which the fuel is heated by the engine;

storing in a memory a schedule of hot restart temperature threshold values as a predetermined function of restart fuel temperatures at the predetermined location;

sensing a shutdown fuel temperature at engine shutdown and at the predetermined location;

sensing a restart fuel temperature at initiation of engine starting and at the predetermined location;

retrieving the hot restart temperature threshold value from the memory corresponding to the sensed restart fuel temperature;

determining a hot restart fuel adjustment amount when the sensed restart fuel temperature is greater than the sensed shutdown fuel temperature by an amount greater than the retrieved hot restart temperature threshold value;

determining a fuel command value equal to a predetermined base restart fuel amount adjusted by the determined hot restart adjustment fuel amount; and controlling the fuel injectors to deliver fuel to the engine in accord with the determined fuel command value.

6. The method of claim 5, wherein the step of determining a hot restart fuel adjustment amount determines the hot restart fuel adjustment amount as a predetermined function of the sensed restart fuel temperature.

* * * * *